US007012180B2

(12) United States Patent
Koeppe, Jr. et al.

(10) Patent No.: US 7,012,180 B2
(45) Date of Patent: Mar. 14, 2006

(54) APPARATUS AND METHOD FOR ADJUSTING STRINGED MUSICAL INSTRUMENTS FOR FRETTED AND UNFRETTED PLAY

(76) Inventors: Douglas F. Koeppe, Jr., 5211 Evans, Austin, TX (US) 78751; Douglas F. Koeppe, Sr., 1101 Skyline Ridge Lookout, Wimberley, TX (US) 78676

( * ) Notice: Subject to any disclaimer, the term of this patent is extended or adjusted under 35 U.S.C. 154(b) by 322 days.

(21) Appl. No.: 10/249,346

(22) Filed: Apr. 2, 2003

(65) Prior Publication Data

US 2004/0194606 A1 Oct. 7, 2004

(51) Int. Cl.
*G01D 3/06* (2006.01)

(52) U.S. Cl. .................... 84/314 R; 84/312 R; 84/293

(58) Field of Classification Search .............. 84/312 R, 84/314 R, 314 N, 293

See application file for complete search history.

(56) References Cited

U.S. PATENT DOCUMENTS 4,297,936 A 11/1981 Mouton
4,722,260 A * 2/1988 Pigozzi .................... 84/314 R
5,325,757 A * 7/1994 Ghenea .................... 84/314 R
6,034,310 A 3/2000 Kolano
6,037,532 A 3/2000 Beckmeier
6,156,961 A 12/2000 Beckmeier
6,350,940 B1 2/2002 Upchurch et al.

* cited by examiner

*Primary Examiner*—Kimberly Lockett
(74) *Attorney, Agent, or Firm*—Taylor Russell & Russell, P.C.

(57) ABSTRACT

An apparatus and method for extending and retracting frets of stringed musical instruments such as a guitar or bass guitar. Each of a plurality of frets is an integral part of a fret-cylinder having an axis oriented approximately perpendicular to the direction of the strings when positioned in a neck of the instrument. Each fret-cylinder has integral cylinder-adjusting teeth that engage rod-adjusting teeth of a rod enclosed within a cavity in the neck of the instrument. Moving the rod in an axial direction by a rod actuating mechanism causes the fret-cylinders to rotate about their axis, extending the frets above a fingerboard attached to the instrument neck for fretted play and retracting the frets flush with the fingerboard for unfretted play. The rod actuating mechanism may be positioned on a neck of an instrument or a body of an instrument, and may be manually or electric motor actuated.

22 Claims, 7 Drawing Sheets

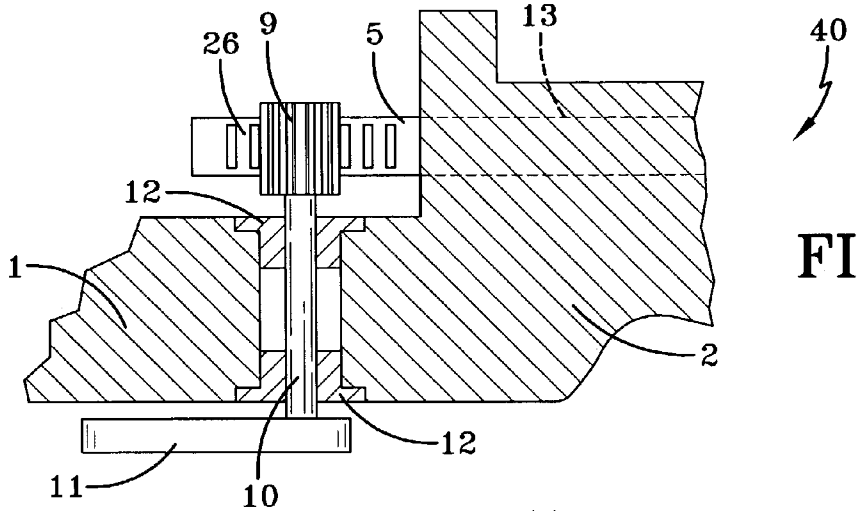
FIG-5
FIG-6
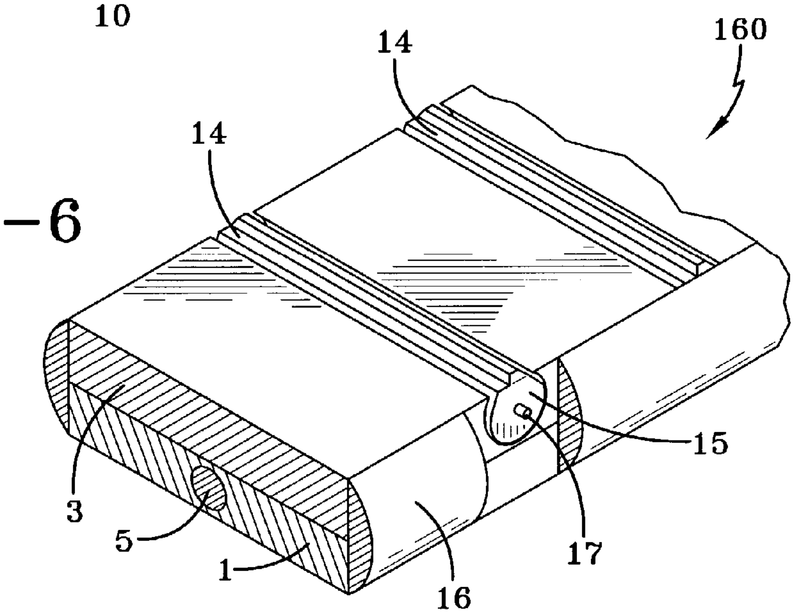
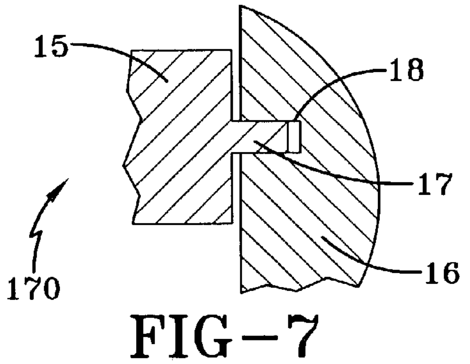
FIG-7
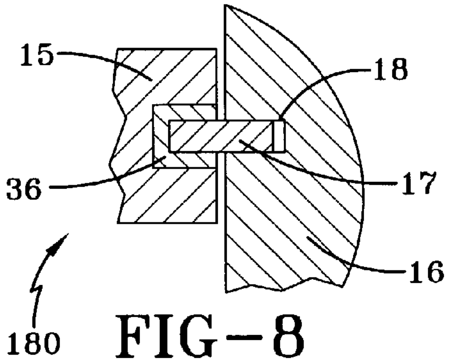
FIG-8

APPARATUS AND METHOD FOR ADJUSTING STRINGED MUSICAL INSTRUMENTS FOR FRETTED AND UNFRETTED PLAY

BACKGROUND OF INVENTION

The invention relates generally to the field of stringed musical instruments having frets, and particularly to stringed musical instruments that may be played using frets and without using frets. More particularly, the invention provides for frets on a fingerboard or neck of a stringed musical instrument that can be raised or lowered in unison, allowing a musician to play the instrument as fretted and unfretted.

Most stringed musical instruments, and particularly guitars and bass guitars, comprise a body fixed to a neck having a fingerboard, and a headstock having tuning pegs and tuning knobs connected to the neck opposite the body. Strings are fixed to the body at one end and adjustably connected to the tuning pegs at the other end for adjusting the string tension and corresponding string pitch. The strings are tensioned between a bridge positioned on the body and a nut positioned on the far end of the neck. A musician plays the instrument by strumming or plucking the strings with one hand while selecting a pitch by pressing the strings down against the fingerboard at suitably selected positions with the other hand. The fingerboard may have frets below the strings and positionally fixed along the fingerboard, oriented substantially perpendicular to the direction of the strings. The fingerboard may be also be unfretted.

For instruments with frets, a musician presses the strings against the fingerboard behind selected frets opposite the body, to produce a pitch from each string that is precisely determined by the distance between the fret and the bridge, and the characteristics of the particular string. The sounds from a fretted instrument tend to be sharp and clearly defined. For instruments without frets a performer presses the strings against the fingerboard to produce a pitch that is determined by the distance between the point where the string is pressed against the fingerboard and the bridge, as well as the characteristics of the particular string. Unfretted instruments usually produce a softer sound and provide a wider range of selectable pitches available to a musician due to the wider range of points where a string may be pressed against a fingerboard. They also enable a musician to produce certain sound characteristics that cannot be produced with an equivalent fretted instrument.

Because of the different sounds produced by fretted and unfretted instruments, musicians sometimes rely on two different instruments, a fretted and an unfretted instrument. It is desirable to have a single instrument that is capable of both fretted and unfretted play, which may be quickly and easily switched between the two modes of play.

SUMMARY OF INVENTION

The present invention provides an apparatus and method for adjusting a stringed musical instrument between fretted and unfretted play, wherein each fret has a cylindrical shape that may be extended above the surface of the fingerboard for fret play or retracted flush with the surface of the fingerboard for fretless play. When extended, the cylindrical shaped frets form surfaces against which the strings of the instrument are pressed in order to change the effective string lengths and thereby change the acoustic pitches of the vibrating strings. Typical instruments that may benefit from this invention include guitars and bass guitars.

The individual fret-cylinders are mounted in recessions formed in the fingerboard/neck and are supported at each end by a dowel and bushing arrangement such that the fret-cylinders may be made to rotate. Because of the cross-sectional shape of the fret-cylinders, the rotating motion causes the frets to be lowered from an extended fretted position to a fully retracted unfretted position. In the following description, that portion of the fret-cylinders against which the strings press when being played in a fretted position are called frets. The parts of the fret-cylinders that do not come in contact with the strings are referred to as cylinders.

The fret-cylinders are made to rotate by means of a rod of suitable material positioned in and extending the length of the neck of the instrument. The rod is movable in the axial direction approximately perpendicular to the axis of the fret-cylinders. The axes of the fret-cylinders are positioned approximately perpendicular to the extended length of the neck of the instrument. The fret-cylinders are provided with a small number of teeth or cogs that run parallel to the axis of the fret-cylinders. These teeth or cogs engage a matching set of teeth or cogs provided along the length of the rod and perpendicular to the axis of the rod. By sliding the rod in its axial direction, the interconnecting teeth or cogs of the rod and the fret-cylinders cause the fret-cylinders to rotate, which causes the frets to be extended or retracted into the fingerboard/neck of the instrument. There are several different embodiments that enable a musician to cause the rod to slide in an axial direction for determining fretted or unfretted play.

An embodiment of the present invention is a method for adjusting a stringed musical instrument for fretted and unfretted play that comprises the steps of slideably moving in an axial direction a rod having an actuating end in a rod hole extending the length of a neck of the instrument, fixing a positional relationship of the actuating end of the rod with respect to multiple instances of rod-adjusting teeth positioned on a circumference and perpendicular to the axis of the rod, engaging each instance of rod-adjusting teeth with a corresponding instance of cylinder-adjusting teeth positioned on a circumference and parallel to an axis of a fret-cylinder, and rotating all fret-cylinders by moving the rod for positioning all frets in an extended fretted position above a fingerboard of the instrument and positioning all frets in a retracted unfretted position flush with the fingerboard of the instrument. The method may further comprise positioning a means for moving the rod on a head stock of the instrument near the actuating end of the rod. The method may further comprise positioning a means for moving the rod on a body of the instrument near the actuating end of the rod. The step of slideably moving may further comprise rotationally adjusting a handle for rotating a gear fixed to the handle by a gear shaft, and engaging the gear with rod teeth positioned at the actuating end of the rod on a circumference and perpendicular to an axis of the rod for moving the rod in an axial direction. The step of slideably moving may further comprise rotationally adjusting a handle for rotating a wheel fixed to the handle by a gear shaft, and engaging a linkage lever for connecting between a linkage lug eccentrically positioned on the wheel and a rotatable saddle positioned on the actuating end of the rod for moving the rod in an axial direction. The step of slideably moving may further comprise rotating a first end of a lever about an axle for rotating a second end of the lever having a lever slot, and positioning a rod arm fixed to the actuating end of the rod into the lever slot for moving the rod in an axial direction. The step of slideably moving may further comprise actuating a reversible electric motor connected to an instrument's electric system for rotating a worm gear fixed to a motor shaft, and engaging the worm gear with rod teeth positioned at the actuating end of the rod on a circumference and perpendicular to an axis of the rod for moving the rod in an axial direction. The method may further comprise activating limit switches by a rod lug fixed to the rod for interrupting a current to the motor for stopping rod movement when the frets are in an extended fretted position above a fingerboard of the instrument and when the frets are in a retracted unfretted position flush with the fingerboard of the instrument.

Another embodiment of the present invention may be an apparatus for adjusting a stringed musical instrument for fretted and unfretted play that comprises means for slideably moving in an axial direction a rod having an actuating end in a rod hole extending the length of a neck of the instrument, the rod having an actuating end fixed in a positional relationship with respect to multiple instances of rod-adjusting teeth positioned on a circumference and perpendicular to the axis of the rod, each instance of rod-adjusting teeth for engaging with a corresponding instance of cylinder-adjusting teeth positioned on a circumference and parallel to an axis of a fret-cylinder, and each fret-cylinder being rotated by moving the rod for positioning a fret in an extended fretted position above a fingerboard of the instrument and positioning the fret in a retracted unfretted position flush with the fingerboard of the instrument. The apparatus may further comprise means for moving the rod being positioned on a head stock of the instrument near the actuating end of the rod. The apparatus may further comprise means for moving the rod being positioned on a body of the instrument near the actuating end of the rod. The means for slideably moving may further comprise a handle for rotating a gear fixed to the handle by a gear shaft and the gear for engaging rod teeth positioned at the actuating end of the rod on a circumference and perpendicular to an axis of the rod for moving the rod in an axial direction. The means for slideably moving may further comprise a handle for rotating a wheel fixed to the handle by a gear shaft, and a linkage lever for connecting between a linkage lug eccentrically positioned on the wheel and a rotatable saddle positioned on the actuating end of the rod for moving the rod in an axial direction. The means for slideably moving may further comprise a lever for rotating about an axle for rotating a second end of the lever having a lever slot, and a rod arm fixed to the actuating end of the rod and positioned into the lever slot for moving the rod in an axial direction. The means for slideably moving may further comprise a reversible electric motor connected to an instrument's electric system for rotating a worm gear fixed to a motor shaft, and the worm gear for engaging rod teeth positioned at the actuating end of the rod on a circumference and perpendicular to an axis of the rod for moving the rod in an axial direction. The apparatus may further comprise limit switches activated by a rod lug fixed to the rod for interrupting a current to the motor for stopping rod movement when the frets are in an extended fretted position above a fingerboard of the instrument and when the frets are in a retracted unfretted position flush with the fingerboard of the instrument.

Yet another embodiment of the present invention includes a kit for adjusting a stringed musical instrument for fretted and unfretted play, capable of being assembled in the field, that comprises means for slideably moving in an axial direction a rod having an actuating end, the rod having an actuating end fixed in a positional relationship with respect to multiple instances of rod-adjusting teeth positioned on a circumference and perpendicular to the axis of the rod, each instance of rod-adjusting teeth for engaging with a corresponding instance of cylinder-adjusting teeth positioned on a circumference and parallel to an axis of a fret-cylinder, each fret-cylinder being rotated by moving the rod for positioning a fret in an extended fretted position above a fingerboard of the instrument and positioning the fret in a retracted unfretted position flush with the fingerboard of the instrument, and a neck for the stringed musical instrument for positioning the moving means, the rod, the fret-cylinders, and the fingerboard. The means for slideably moving may further comprise a handle for rotating a gear fixed to the handle by a gear shaft positioned on the neck, and the gear for engaging rod teeth positioned at the actuating end of the rod on a circumference and perpendicular to an axis of the rod for moving the rod in an axial direction. The means for slideably moving may further comprise a handle for rotating a wheel fixed to the handle by a gear shaft positioned on the neck, and a linkage lever for connecting between a linkage lug eccentrically positioned on the wheel and a rotatable saddle positioned on the actuating end of the rod for moving the rod in an axial direction. The means for slideably moving may further comprise a lever for rotating about an axle for rotating a second end of the lever having a lever slot positioned on the neck, and a rod arm fixed to the actuating end of the rod and positioned into the lever slot for moving the rod in an axial direction. The means for slideably moving may further comprises a reversible electric motor positioned on the neck and connected to an instrument's electric system for rotating a worm gear fixed to a motor shaft, and the worm gear for engaging rod teeth positioned at the actuating end of the rod on a circumference and perpendicular to an axis of the rod for moving the rod in an axial direction. The kit may further comprise limit switches positioned on the neck and activated by a rod lug fixed to the rod for interrupting a current to the motor for stopping rod movement when the frets are in an extended fretted position above a fingerboard of the instrument and when the frets are in a retracted unfretted position flush with the fingerboard of the instrument.

DESCRIPTION OF NUMERIC REFERENCES OF INVENTION EMBODIMENTS

| Description of Numeric References of Invention Embodiments | |
|---|---|
| 1. | Head Stock |
| 2. | Neck |
| 3. | Fingerboard |
| 4. | Fret-Cylinder |
| 5. | Slidable Rod |
| 6. | Strings |
| 7. | Tuning Pegs |
| 8. | Tuning Knobs |
| 9. | Gear |
| 10. | Gear Shaft |
| 11. | Handle |
| 12. | Bushing/Cover Plate |
| 13. | Rod Hole |
| 14. | Fret |
| 15. | Fret-Cylinder |
| 16. | Side Plate |
| 17. | Pinion |
| 18. | Side Plate Hole |
| 19. | Instrument Body |
| 20. | Electric Motor |
| 21. | Worm Gear |
| 22. | Motor Shaft |

-continued

| Description of Numeric References of Invention Embodiments | |
|---|---|
| 23. | Switch |
| 24. | Wires |
| 25. | Limit Switches |
| 26. | Rod Teeth |
| 27. | Rod Lug |
| 28. | Lever |
| 29. | Axle |
| 30. | Lever Slot |
| 31. | Rod Arm |
| 32. | Wheel |
| 33. | Linkage Lug |
| 34. | Linkage Lever |
| 35. | Rotatable Saddle |
| 36. | Fret-Cylinder Bushing |
| 37. | Slot in Head Stock |
| 38. | Rod-Adjusting Teeth |
| 39. | Cylinder-Adjusting Teeth |

BRIEF DESCRIPTION OF DRAWINGS

These and other features, aspects and advantages of the present invention will become better understood with regard to the following description, appended claims, and accompanying drawings wherein:

FIG. 5 shows a section view of the head stock and upper neck area of the FIG. 2 embodiment for actuating the rod;

FIG. 6 shows a portion of the neck and fingerboard showing several frets;

FIG. 7 shows an embodiment of rotatably mounting a fret-cylinder to a side plate;

FIG. 8 shows an alternative embodiment of rotatably mounting a fret-cylinder to a side plate;

DETAILED DESCRIPTION

Figure 1:
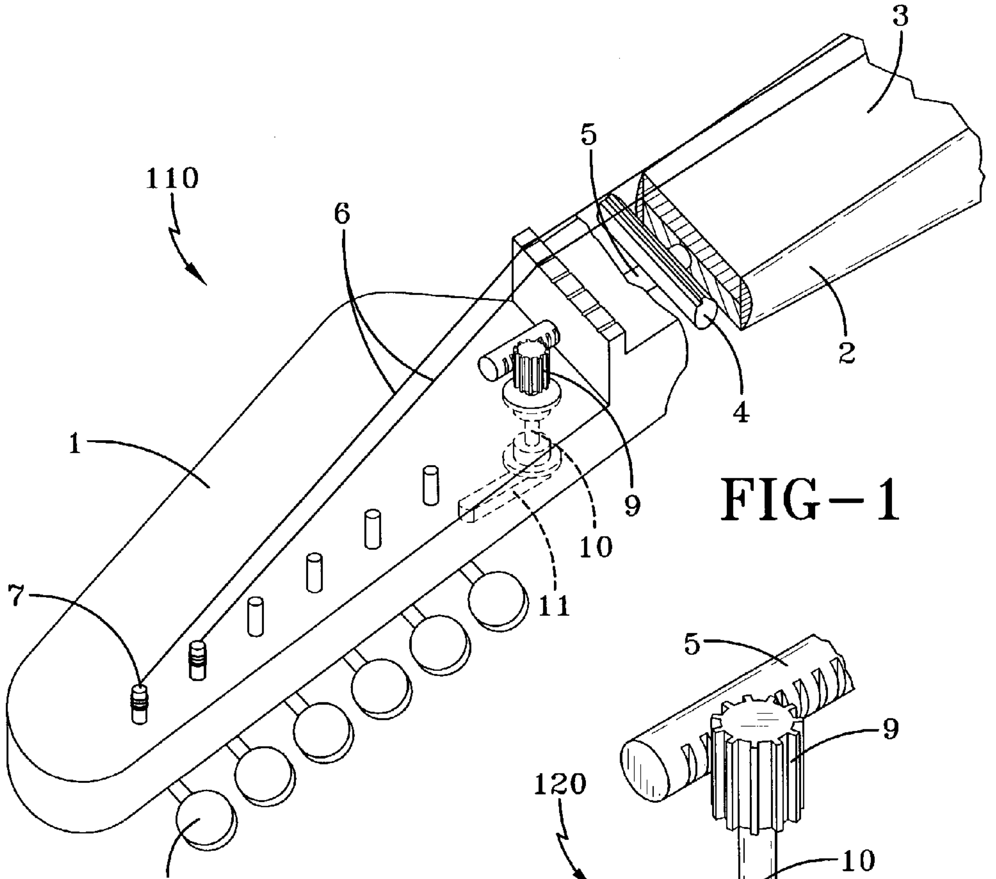
FIG. 1 shows a partial sectional view of a head stock and fingerboard of a stringed musical instrument having all tuning knobs on the same side of the head stock.

Turning now to FIG. 1, FIG. 1 shows a partial sectional view 110 of a head stock 1 and fingerboard 3 connected to the neck 2 of a stringed musical instrument such as a guitar or bass guitar having all tuning knobs 8 on the same side of the head stock 1. The view 110 also shows strings 6 wrapped around tuning pegs 7, that are rotatably connected to tuning knobs 8, as conventionally configured on a guitar or bass guitar, whereby the tuning knobs 8 are turned to adjust tension on the strings 6 to determine acoustic pitch. An embodiment of the present invention is also shown in the view 110 that includes a fret-cylinder 4 that connectively engages a slidable rod 5, and a rod adjusting mechanism comprising a handle 11, a gear shaft 10 and a gear 9. The slidable rod 5 extends from the head stock 1 through an aperture in the neck 2 to the instrument body.

Figure 2:
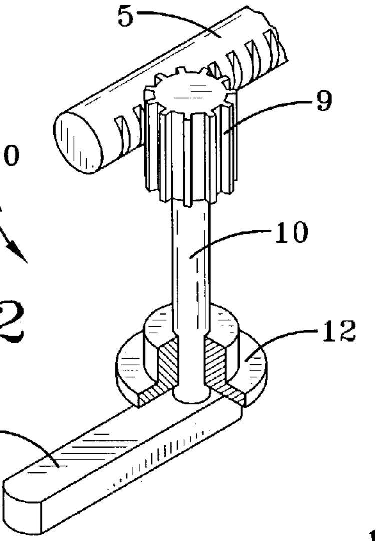
FIG. 2 shows an embodiment of a means for adjusting a position of a rod.
Figure 3:
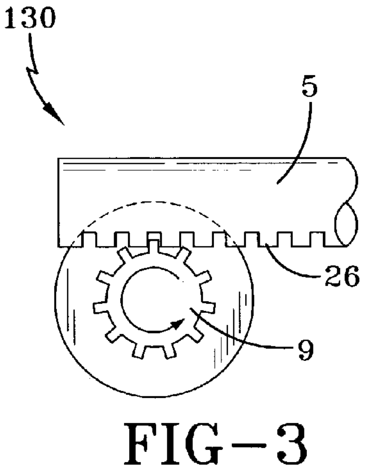
FIG. 3 shows a top view of the FIG. 2 embodiment of a gear engaging means for actuating the rod.
Figure 4:
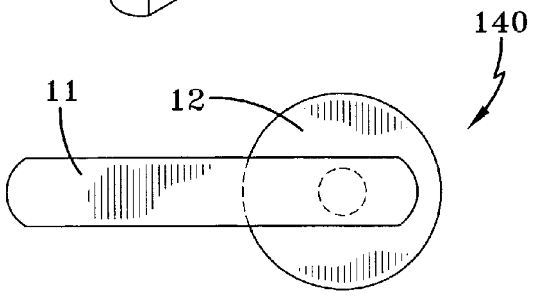
FIG. 4 shows a bottom view of the FIG. 2 embodiment of the handle actuating means for actuating the rod.

Turning to FIG. 2, FIG. 2 shows an embodiment of a means for adjusting a position of the rod. A rod adjusting mechanism 120 shown in FIG. 2 is an isometric view of the rod adjusting mechanism 120 comprising a handle 11, a gear shaft 10 and a gear 9, as describe in FIG. 1. FIG. 3 is a top view 130 and FIG. 4 is a bottom view of the rod adjusting mechanism 120 shown in FIG. 2. The handle 11 is fixed to the gear shaft 10, which is fixed to the gear 9. The gear 9 engages rod teeth 26 on the rod 5 such that when a musician turns the handle 11, the gear 9 is caused to rotate, causing the rod 5 to move in an axial direction.

Turning to FIG. 5, FIG. 5 shows a section view 150 of the head stock 1 and upper neck area 2 of the FIG. 2 embodiment for actuating the rod 5. As shown in FIG. 5, the handle 11 is connected to the gear shaft 10, which is rotatably positioned in the head stock 1 by bushing/cover plates 12. The gear 9 engages the teeth 26 on the rod 5 causing it move within a rod hole 13 in the neck 2. The rod hole 13 extends the length of the neck 2. The fit of the rod 5 within the rod hole 13 is such that the hole diameter is no more than necessary to permit slidable axial movement of the rod 5 within the hole 13 with minimal restriction.

Turning to FIG. 6, FIG. 6 shows a portion 160 of the neck 1 and fingerboard 3 showing several frets 14. The frets 14 form a part of the fret-cylinders 15 in an extended position. FIG. 6 also show one fret-cylinder 15 with a portion of a side plate 16 cut away to reveal the general shape of the fret-cylinders 15. Located at both ends of each fret-cylinder 15 is a pinion 17 for positioning the fret-cylinders 15. FIG. 7 shows an embodiment 170 of rotatably mounting a fret-cylinder 15 to a side plate 16 using a pinion 17 that is located on the fret-cylinder 15 to fit within a hole 18 in a side plate. FIG. 8 shows an alternative embodiment 180 of rotatably mounting a fret-cylinder 15 to a side plate 16 using a pinion 17 that fits into a fret-cylinder bushing 36 located in a fret-cylinder 15, and fits into a hole 18 in a side plate 16.

Figure 9:
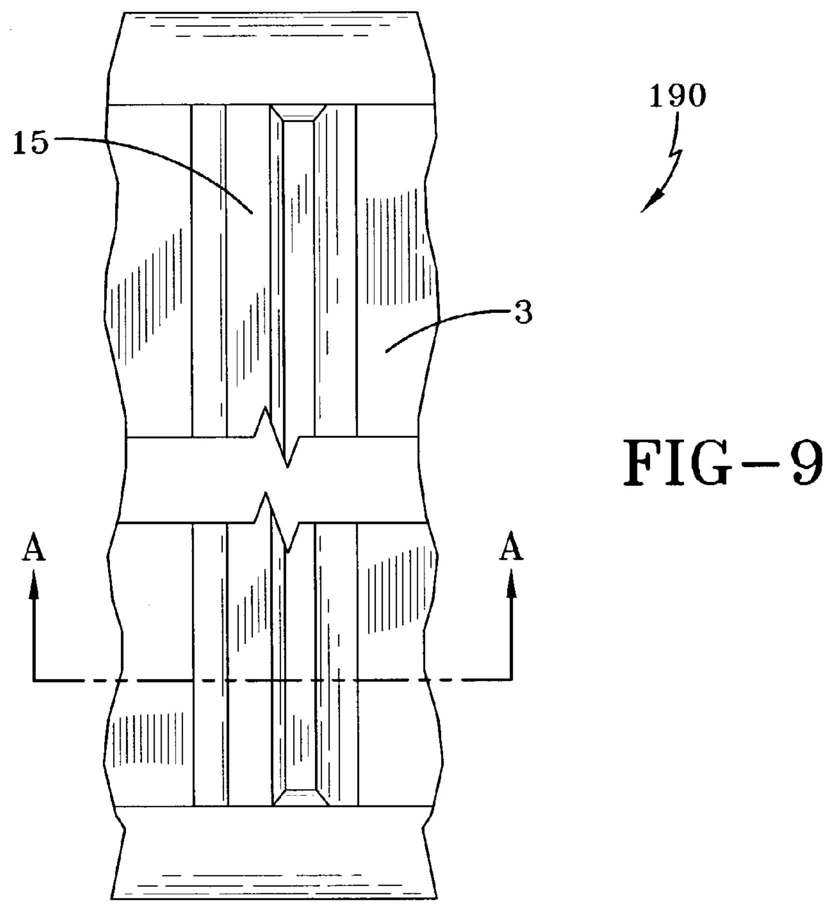
FIG. 9 shows a top view of a fret-cylinder installed in a fingerboard.
Figure 10A:
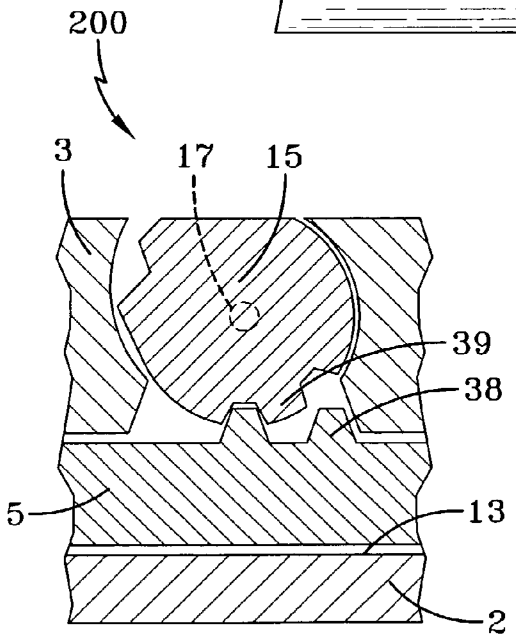
FIG. 10 shows sectional views of the fingerboard and neck assembly, including a rod and a fret-cylinder in an extended position and in a retracted position.
Figure 10B:
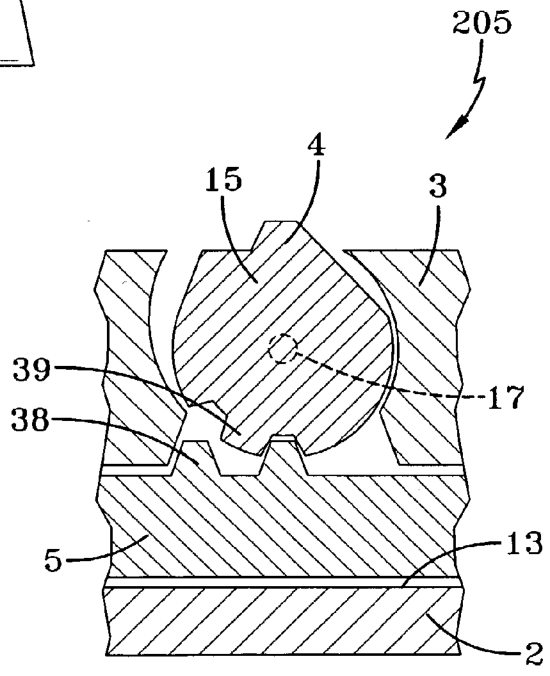

Turning to FIG. 9, FIG. 9 shows a top view 190 of a fret-cylinder 15 installed in a fingerboard 3. FIG. 10A shows a sectional view 200 of the section A—A shown in FIG. 9, showing the fingerboard 3 and neck 2, including a rod 5 and a fret-cylinder 15 in a retracted position. The rod 5 has rod-adjusting teeth 38 that engage cylinder-adjusting teeth 39 on the fret-cylinder 15. When the rod 5 is caused to move in an axial direction by the rod adjusting mechanism 120 shown in FIG. 2, the rod-adjusting teeth 38 engage the cylinder-adjusting teeth 38, causing the fret-cylinder 15 to rotate about an axis determined by the pinion 17. FIG. 10B shows a sectional view 205 of the section A—A shown in FIG. 9 showing the fingerboard 3 and neck 2, including a rod 5 and a fret-cylinder 15 in an extended position with a fret 4 extending above a surface of the fingerboard 3. The fret 4 may be retracted in an unfretted position shown in FIG. 10A or extended in a fretted position shown in FIG. 10B by axial movement of the rod 5.

Figure 11:
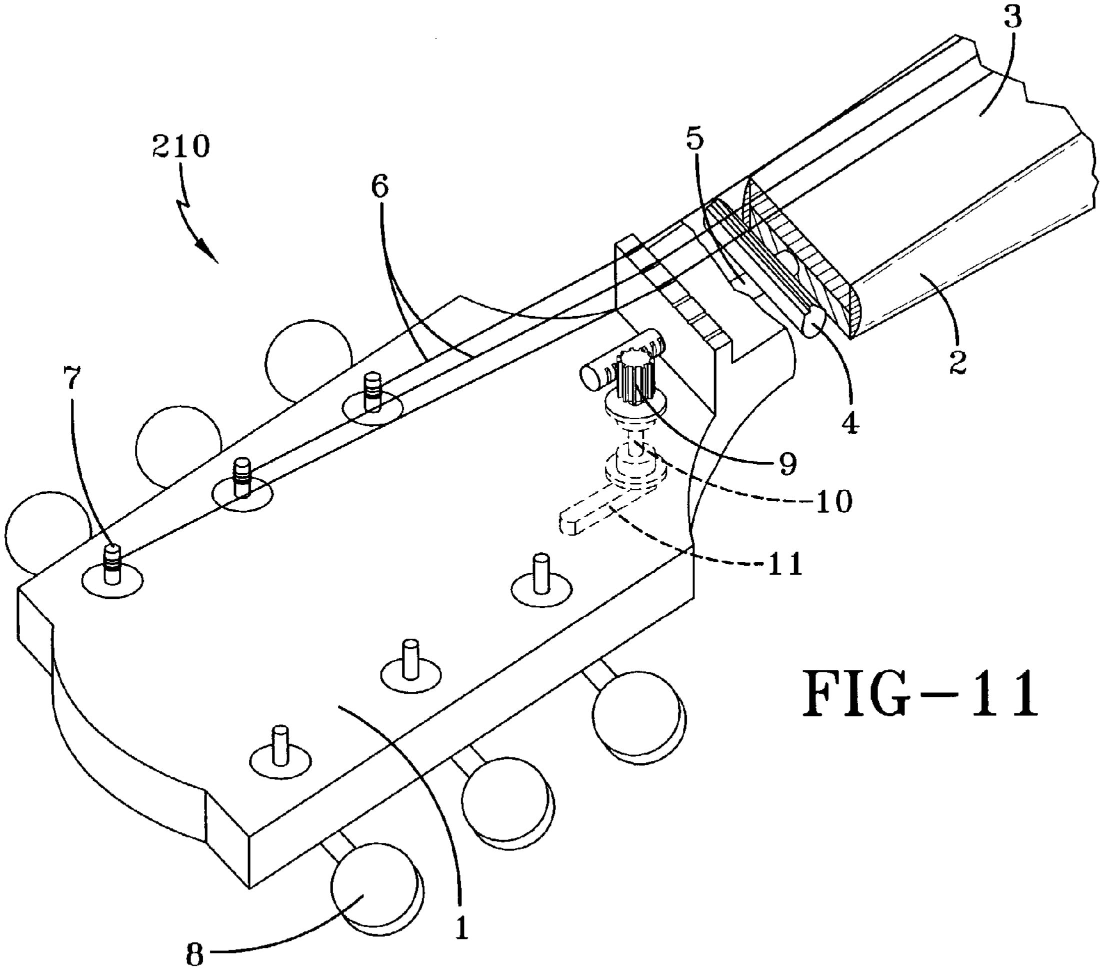
FIG. 11 shows a partial sectional view of a head stock and fingerboard of a stringed musical instrument having tuning knobs equally located on both sides of the head stock.

Turning now to FIG. 11, FIG. 11 shows a partial sectional view 210 of a head stock 1 and fingerboard 3 connected to the neck 2 of a stringed musical instrument such as a guitar or bass guitar having tuning knobs 8 equally located on both sides of the head stock 1. The view 210 also shows strings 6 wrapped around tuning pegs 7, that are rotatably connected to tuning knobs 8, as conventionally configured on a guitar or bass guitar, whereby the tuning knobs 8 are turned to adjust tension on the strings 6 to determine acoustic pitch. An embodiment of the present invention is also shown in the view 210 that includes a fret-cylinder 4 that connectively engages a slidable rod 5, and a rod adjusting mechanism comprising a handle 11, a gear shaft 10 and a gear 9. The slidable rod 5 extends from the head stock 1 through an aperture in the neck 2 to the instrument body. The description of the embodiment of the present invention shown in FIG. 11 is the same as that described with reference to FIG. 1 through FIG. 5, and will not be repeated here for brevity.

Figure 12:
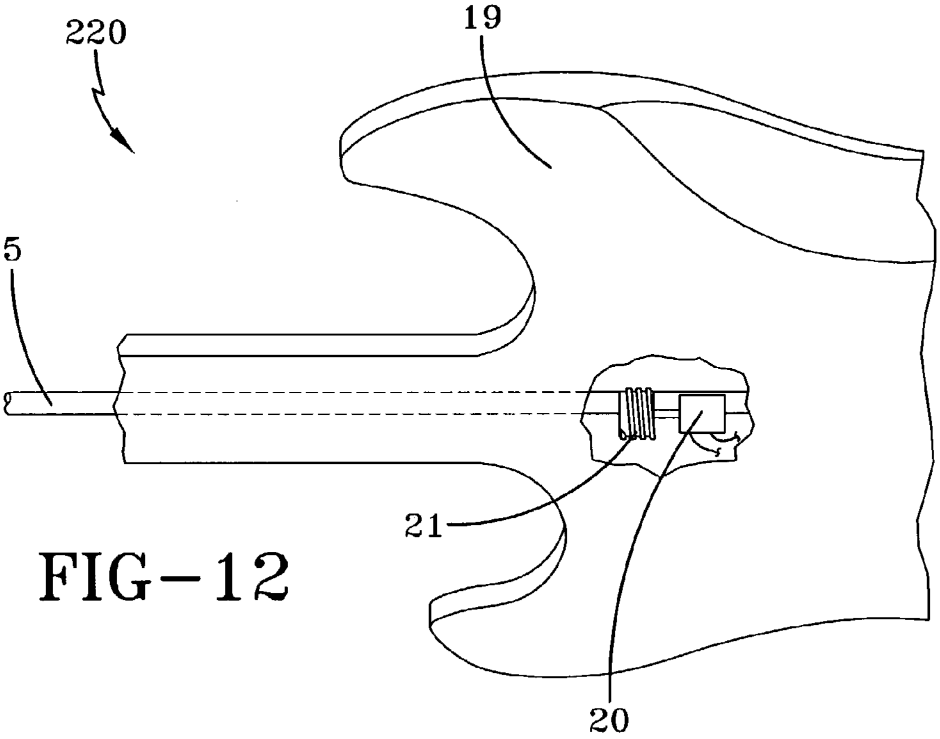
FIG. 12 shows an alternative embodiment of a means for actuating the rod with an electric motor in an instrument body.
Figure 13:
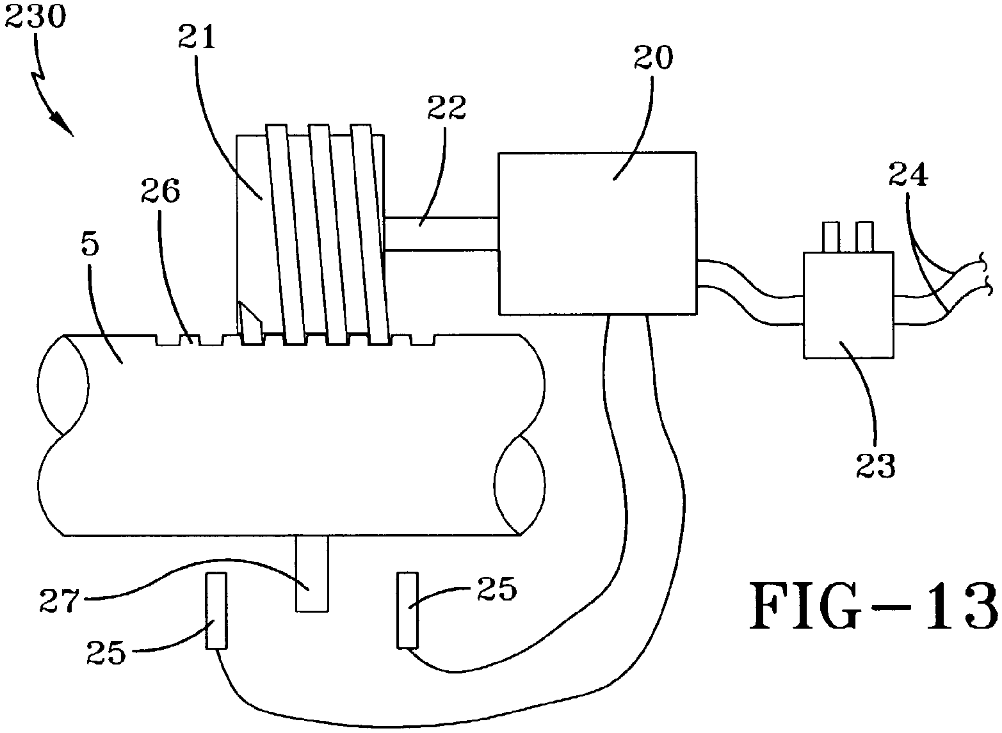
FIG. 13 shows a detailed implementation of the embodiment of FIG. 12.

Turning now to FIG. 12, FIG. 12 shows an alternative embodiment 220 of a means for actuating the rod 5 with a small reversible electric motor 20 connected to a worm gear 21 located within an instrument body 19. Turning to FIG. 13, FIG. 13 shows a detailed implementation 230 of the embodiment of FIG. 12. The small reversible electric motor 20 is connected to a worm gear 21 by a motor shaft 22, causing the worm gear 21 to rotatably engage rod teeth 26 on the rod 5, moving the rod 5 in an axial direction. A switch 23 connected by wires 24 to an electric system associated with the stringed musical instrument actuates the motor 20. Motion limit switches 25 are activated by a rod lug 27 attached to the rod 5 to interrupt the current to the motor 20, causing the motor 20 to stop when travel of the rod 5 reaches a position where the frets (4 in FIG. 10B) are either completely extended in a fretted position (shown in FIG. 10B) or completely retracted in an unfretted position (shown in FIG. 10A).

Figure 14:
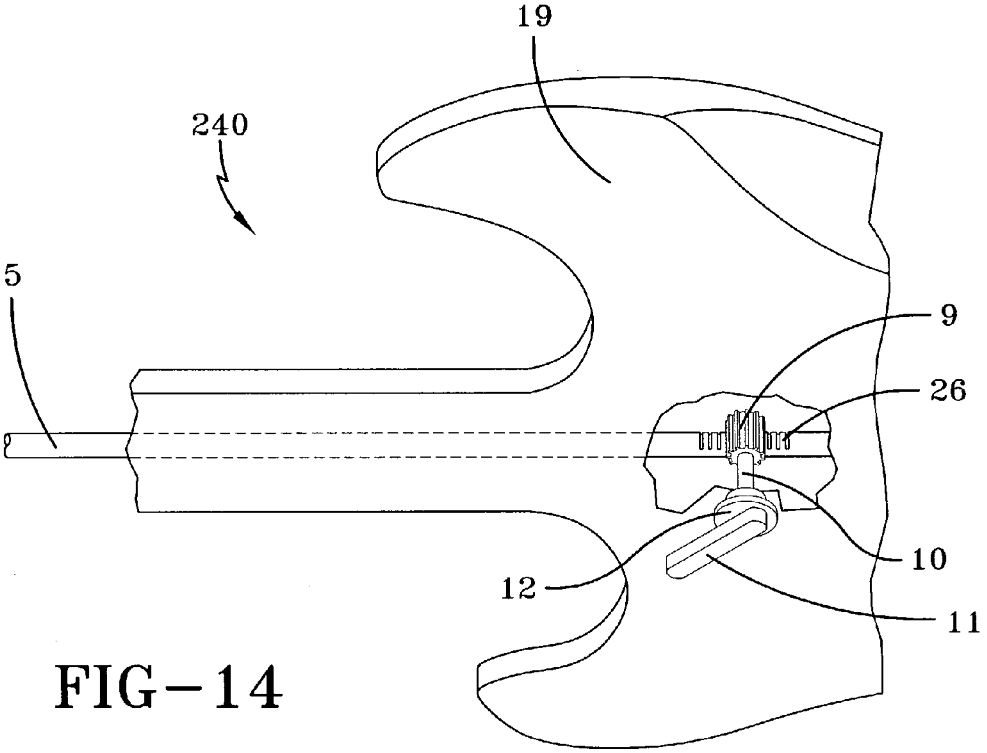
FIG. 14 shows an alternative embodiment of a method for actuating the rod by manual means in an instrument body.
Figure 15:
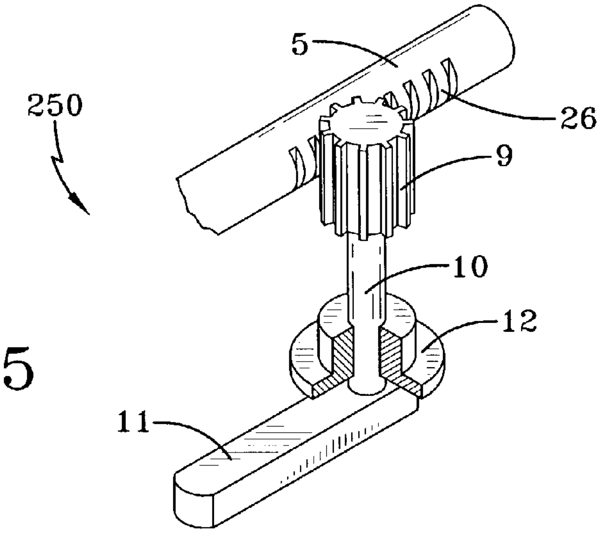
FIG. 15 shows a detailed implementation of the embodiment of FIG. 14.

Turning to FIG. 14, FIG. 14 shows an alternative embodiment 240 of a method for actuating the rod 5 by manual means comprising an adjusting mechanism that includes a handle 11, a bushing/cover plate 12, a gear shaft 10, a gear 9, a rod 5, and rod teeth 26, all located in an instrument body 19. Turning to FIG. 15, FIG. 15 shows a detailed implementation of the embodiment of FIG. 14. FIG. 15 is similar to the adjusting mechanism shown in FIG. 2. A rod adjusting mechanism 250 shown in FIG. 15 is an isometric view of the rod adjusting mechanism 250 comprising a handle 11, a bushing/cover plate 12, a gear shaft 10, a gear 9, a rod 5, and rod teeth 26. The handle 11 is fixed to the gear shaft 10, which is fixed to the gear 9. The gear 9 engages rod teeth 26 on the rod 5 such that when a musician turns the handle 11, the gear 9 is caused to rotate, causing the rod 5 to move in an axial direction. This movement of the rod 5 causes the frets shown in FIG. 10 to be extended or retracted. The bushing 12 positions the gear shaft 10, allowing the gear shaft 10 to freely rotate within the bushing 12.

Figure 16:
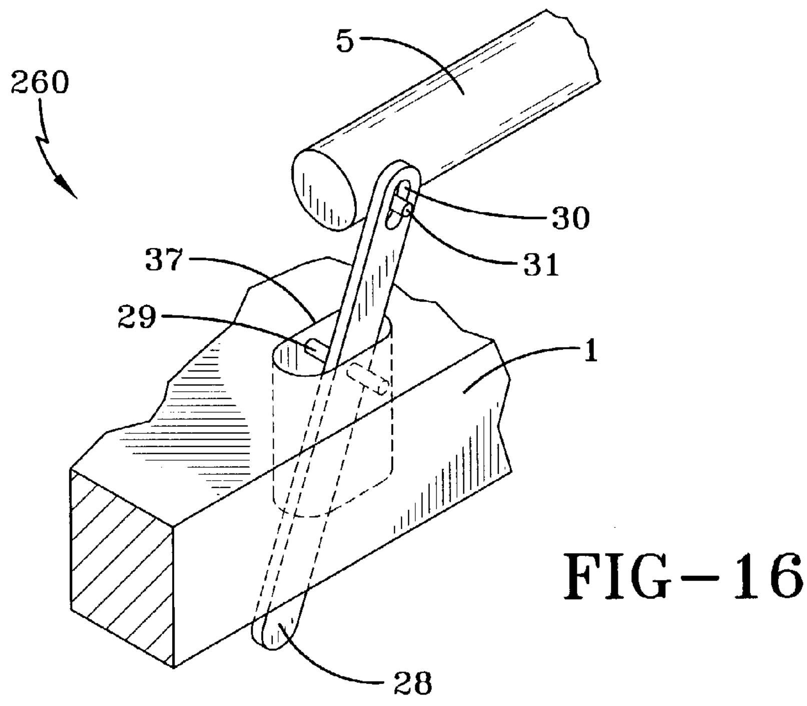
FIG. 16 shows another embodiment of a means for actuating the rod by manual means at the instrument head stock.

Turning to FIG. 16, FIG. 16 shows another embodiment of a means 260 for adjusting a rod 5 by manual means at the instrument head stock 1. The adjusting means 260 shown in FIG. 16 comprises a slot 37 in the head stock 1 to receive a lever 28 that may pivot about an axle 29. A lever slot 30 is provided in the upper part of the lever 28 to receive a rod arm 31 fixed to the rod 5, and extending from the rod 5 through the lever slot 30. Movement of the lever 29 by a musician imparts movement in an axial direction to the rod 5, which causes the frets shown in FIG. 10 to be extended or retracted. Although this adjusting means 260 is shown positioned in the head stock 1 of a stringed musical instrument, it may also be located in a body of a stringed musical instrument to accomplish the same axial movement of a rod 5.

Figure 17:
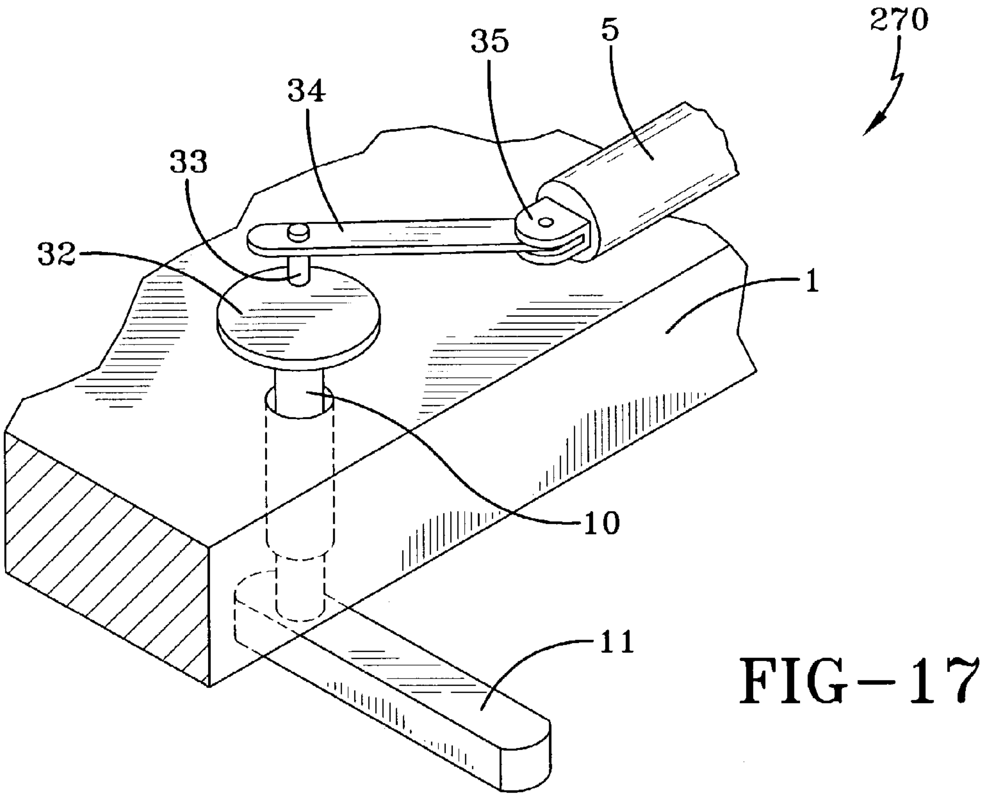
FIG. 17 shows yet another embodiment of a means for actuating the rod by manual means at the instrument head stock.

Turning now to FIG. 17, FIG. 17 shows yet another embodiment of a means 270 for adjusting a rod 5 by manual means at the instrument head stock 1. The adjusting means 270 shown in FIG. 17 comprises a handle 11 attached to a gear shaft 10, which passes through the head stock 1. Fixed to gear shaft 10 at the opposite end from the handle 11 is a wheel 32 having a linkage lug 33 that is radially offset from center of the wheel 32. The linkage lug 33 is rotatably attached near an end of a linkage lever 34 that is rotatably attached to a saddle 35 near an opposite end of the linkage lever 34. The saddle 35 is fixed to an end of the rod 5. The wheel 32 and the linkage lug 33 function as a cam to transfer rotational motion of the shaft 10 to linear motion of the rod 5 in an axial direction. Movement of the lever 11 by a musician imparts movement in an axial direction to the rod 5, which causes the frets shown in FIG. 10 to be extended or retracted. Although this adjusting means 270 is shown positioned in the head stock 1 of a stringed musical instrument, it may also be located in a body of a stringed musical instrument to accomplish the same axial movement of a rod 5.

Although the present invention has been described in detail with reference to certain preferred embodiments, it should be apparent that modifications and adaptations to those embodiments might occur to persons skilled in the art without departing from the spirit and scope of the present invention.

The invention claimed is:

1. A method for adjusting a stringed musical instrument for fretted and unfretted play, comprising the steps of:
   - slideably moving in an axial direction a rod having an actuating end in a rod hole extending the length of a neck of the instrument;
   - fixing a positional relationship of the actuating end of the rod with respect to multiple instances of rod-adjusting teeth positioned on a circumference and perpendicular to the axis of the rod;
   - engaging each instance of rod-adjusting teeth with a corresponding instance of cylinder-adjusting teeth positioned on a circumference and parallel to an axis of a fret-cylinder; and
   - rotating all fret-cylinders by moving the rod for positioning all frets in an extended fretted position above a fingerboard of the instrument and positioning all frets in a retracted unfretted position flush with the fingerboard of the instrument.

2. The method of claim 1, further comprising positioning a means for moving the rod on a head stock of the instrument near the actuating end of the rod.

3. The method of claim 1, further comprising positioning a means for moving the rod on a body of the instrument near the actuating end of the rod.

4. The method of claim 1, wherein the step of slideably moving further comprises the steps of:
   - rotationally adjusting a handle for rotating a gear fixed to the handle by a gear shaft; and
   - engaging the gear with rod teeth positioned at the actuating end of the rod on a circumference and perpendicular to an axis of the rod for moving the rod in an axial direction.

5. The method of claim 1, wherein the step of slideably moving further comprises the steps of:

rotationally adjusting a handle for rotating a wheel fixed to the handle by a gear shaft; and engaging a linkage lever for connecting between a linkage lug eccentrically positioned on the wheel and a rotatable saddle positioned on the actuating end of the rod for moving the rod in an axial direction.

6. The method of claim 1, wherein the step of slideably moving further comprises the steps of:

rotating a first end of a lever about an axle for rotating a second end of the lever having a lever slot; and positioning a rod arm fixed to the actuating end of the rod into the lever slot for moving the rod in an axial direction.

7. The method of claim 1, wherein the step of slideably moving further comprises the steps of:

actuating a reversible electric motor connected to an instrument's electric system for rotating a worm gear fixed to a motor shaft; and engaging the worm gear with rod teeth positioned at the actuating end of the rod on a circumference and perpendicular to an axis of the rod for moving the rod in an axial direction.

8. The method of claim 7, further comprising the step of activating limit switches by a rod lug fixed to the rod for interrupting a current to the motor for stopping rod movement when the frets are in an extended fretted position above a fingerboard of the instrument and when the frets are in a retracted unfretted position flush with the fingerboard of the instrument.

9. An apparatus for adjusting a stringed musical instrument for fretted and unfretted play, comprising:

means for slideably moving in an axial direction a rod having an actuating end in a rod hole extending the length of a neck of the instrument;

the rod having an actuating end fixed in a positional relationship with respect to multiple instances of rod-adjusting teeth positioned on a circumference and perpendicular to the axis of the rod;

each instance of rod-adjusting teeth for engaging with a corresponding instance of cylinder-adjusting teeth positioned on a circumference and parallel to an axis of a fret-cylinder; and each fret-cylinder being rotated by moving the rod for positioning a fret in an extended fretted position above a fingerboard of the instrument and positioning the fret in a retracted unfretted position flush with the fingerboard of the instrument.

10. The apparatus of claim 9, further comprising means for moving the rod being positioned on a head stock of the instrument near the actuating end of the rod.

11. The apparatus of claim 9, further comprising means for moving the rod being positioned on a body of the instrument near the actuating end of the rod.

12. The apparatus of claim 9, wherein the means for slideably moving further comprises:

a handle for rotating a gear fixed to the handle by a gear shaft; and the gear for engaging rod teeth positioned at the actuating end of the rod on a circumference and perpendicular to an axis of the rod for moving the rod in an axial direction.

13. The apparatus of claim 9, wherein the means for slideably moving further comprises:

a handle for rotating a wheel fixed to the handle by a gear shaft; and a linkage lever for connecting between a linkage lug eccentrically positioned on the wheel and a rotatable saddle positioned on the actuating end of the rod for moving the rod in an axial direction.

14. The apparatus of claim 9, wherein the means for slideably moving further comprises:

a lever for rotating about an axle for rotating a second end of the lever having a lever slot; and a rod arm fixed to the actuating end of the rod and positioned into the lever slot for moving the rod in an axial direction.

15. The apparatus of claim 9, wherein the means for slideably moving further comprises:

a reversible electric motor connected to an instrument's electric system for rotating a worm gear fixed to a motor shaft; and the worm gear for engaging rod teeth positioned at the actuating end of the rod on a circumference and perpendicular to an axis of the rod for moving the rod in an axial direction.

16. The apparatus of claim 15, further comprising limit switches activated by a rod lug fixed to the rod for interrupting a current to the motor for stopping rod movement when the frets are in an extended fretted position above a fingerboard of the instrument and when the frets are in a retracted unfretted position flush with the fingerboard of the instrument.

17. A kit for adjusting a stringed musical instrument for fretted and unfretted play, capable of being assembled in the field, comprising:

means for slideably moving in an axial direction a rod having an actuating end;

the rod having an actuating end fixed in a positional relationship with respect to multiple instances of rod-adjusting teeth positioned on a circumference and perpendicular to the axis of the rod;

each instance of rod-adjusting teeth for engaging with a corresponding instance of cylinder-adjusting teeth positioned on a circumference and parallel to an axis of a fret-cylinder;

each fret-cylinder being rotated by moving the rod for positioning a fret in an extended fretted position above a fingerboard of the instrument and positioning the fret in a retracted unfretted position flush with the fingerboard of the instrument; and a neck for the stringed musical instrument for positioning the moving means, the rod, the fret-cylinders, and the fingerboard.

18. The kit of claim 17, wherein the means for slideably moving further comprises:

a handle for rotating a gear fixed to the handle by a gear shaft positioned on the neck; and the gear for engaging rod teeth positioned at the actuating end of the rod on a circumference and perpendicular to an axis of the rod for moving the rod in an axial direction.

19. The kit of claim 17, wherein the means for slideably moving further comprises:

a handle for rotating a wheel fixed to the handle by a gear shaft positioned on the neck; and a linkage lever for connecting between a linkage lug eccentrically positioned on the wheel and a rotatable saddle positioned on the actuating end of the rod for moving the rod in an axial direction.

20. The kit of claim 17, wherein the means for slideably moving further comprises:

a lever for rotating about an axle for rotating a second end of the lever having a lever slot positioned on the neck; and a rod arm fixed to the actuating end of the rod and positioned into the lever slot for moving the rod in an axial direction.

21. The kit of claim 17, wherein the means for slideably moving further comprises:

a reversible electric motor positioned on the neck and connected to an instrument's electric system for rotating a worm gear fixed to a motor shaft; and the worm gear for engaging rod teeth positioned at the actuating end of the rod on a circumference and perpendicular to an axis of the rod for moving the rod in an axial direction.

22. The kit of claim 21, further comprising limit switches positioned on the neck and activated by a rod lug fixed to the rod for interrupting a current to the motor for stopping rod movement when the frets are in an extended fretted position above a fingerboard of the instrument and when the frets are in a retracted unfretted position flush with the fingerboard of the instrument.

* * * * *